Figure 4:
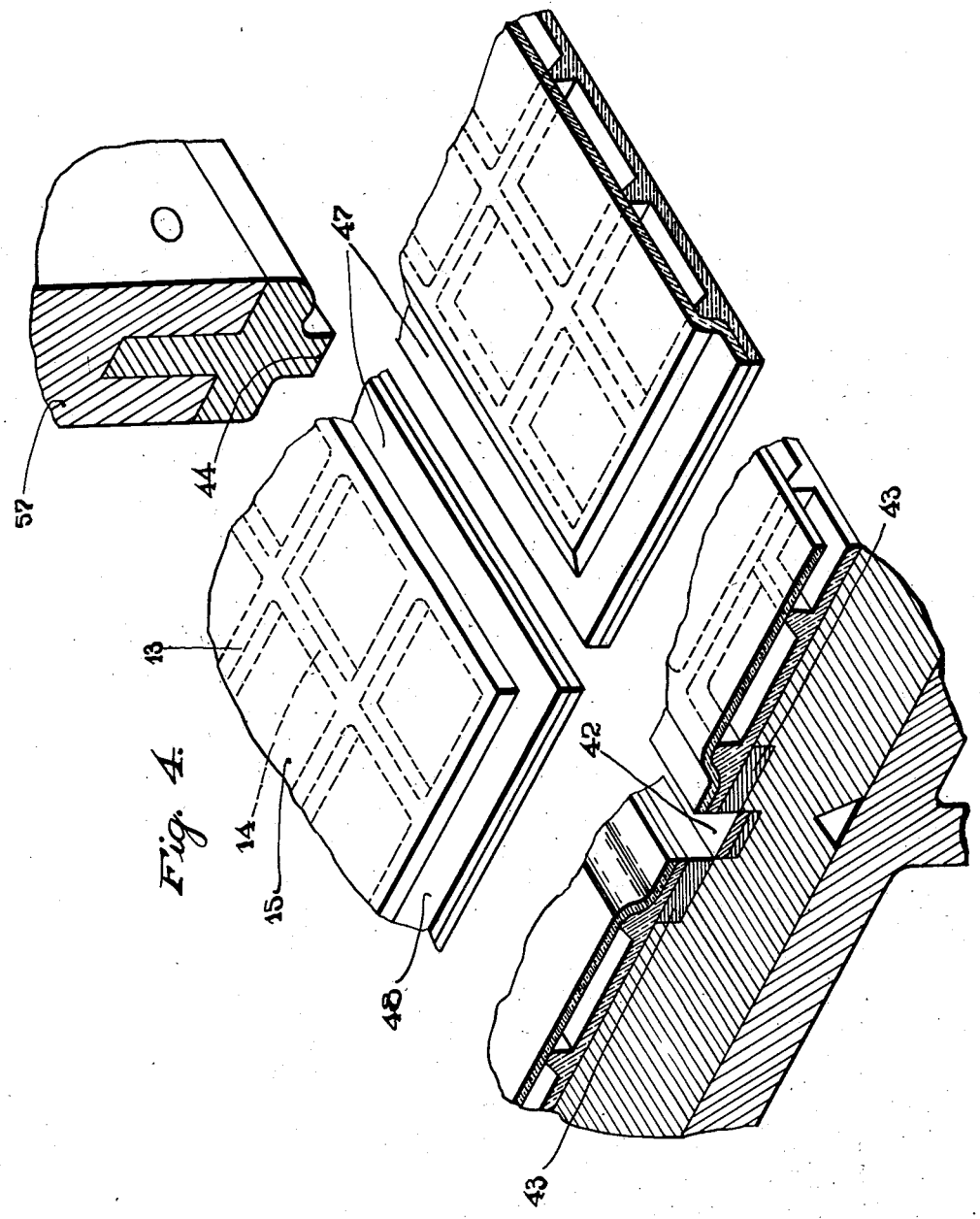

Dec. 18, 1934.    J. H. FOX    1,984,924
APPARATUS FOR MAKING INSULATING GLASS
Filed Aug. 5, 1933    5 Sheets-Sheet 1
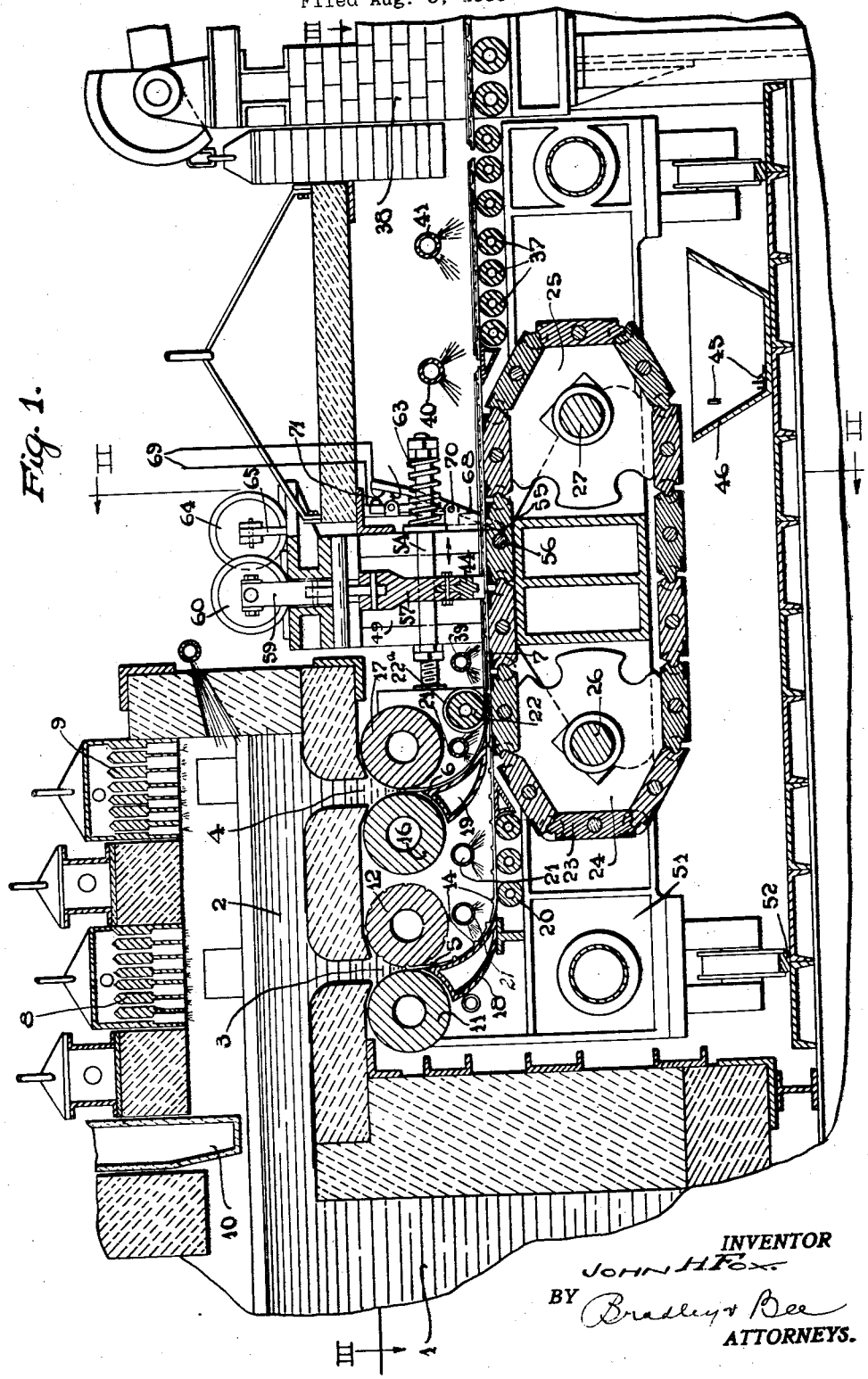
INVENTOR
John H. Fox
BY Bradley & Bee
ATTORNEYS.

Dec. 18, 1934.  J. H. FOX  1,984,924
APPARATUS FOR MAKING INSULATING GLASS
Filed Aug. 5, 1933  5 Sheets-Sheet 2
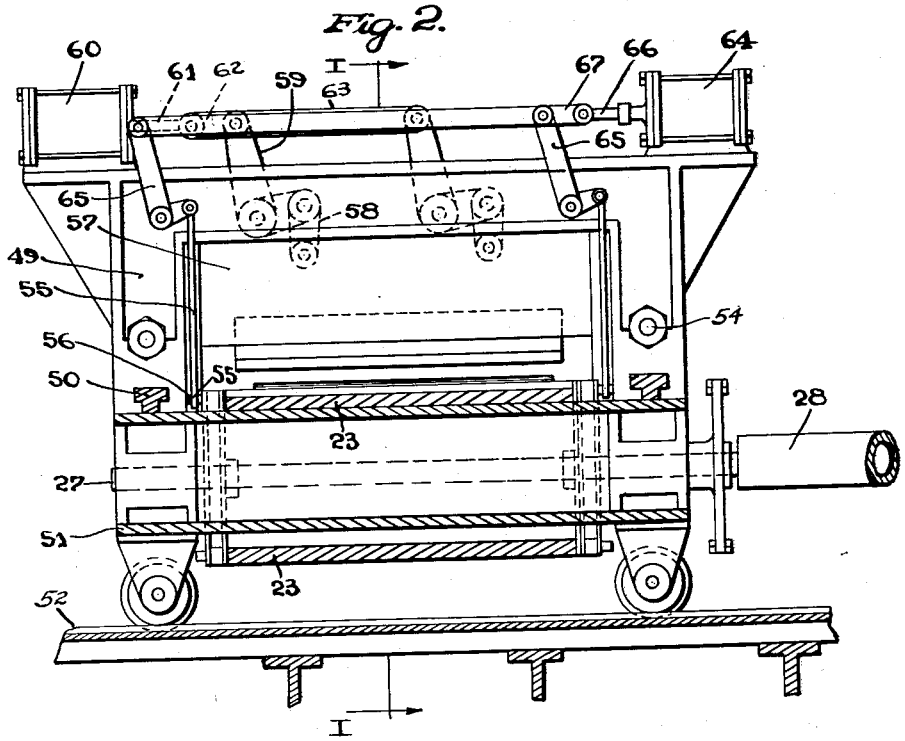
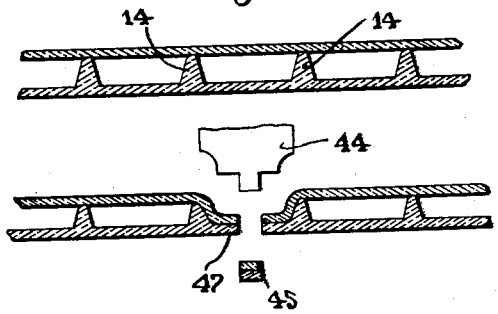
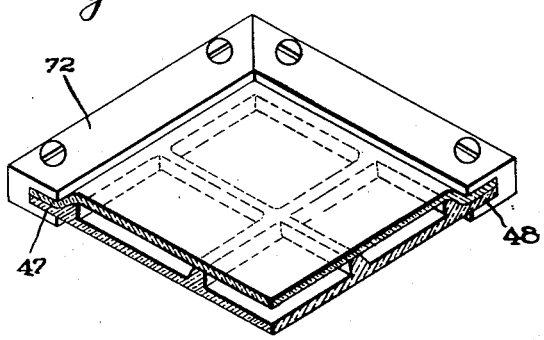
INVENTOR
John H. Fox.
BY
ATTORNEYS.

Dec. 18, 1934.  J. H. FOX  1,984,924
APPARATUS FOR MAKING INSULATING GLASS
Filed Aug. 5, 1933  5 Sheets-Sheet 3
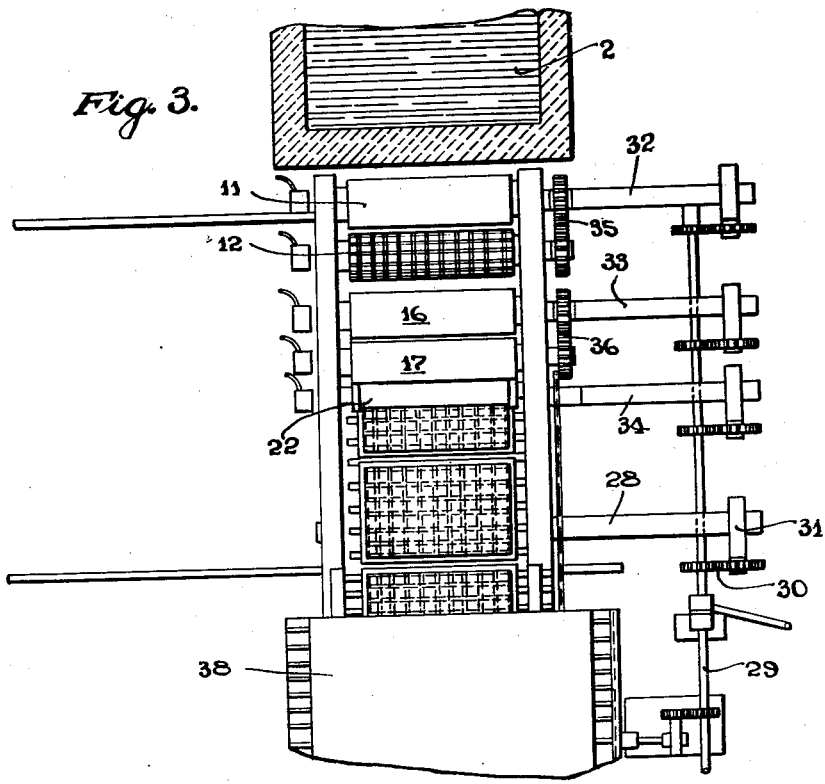
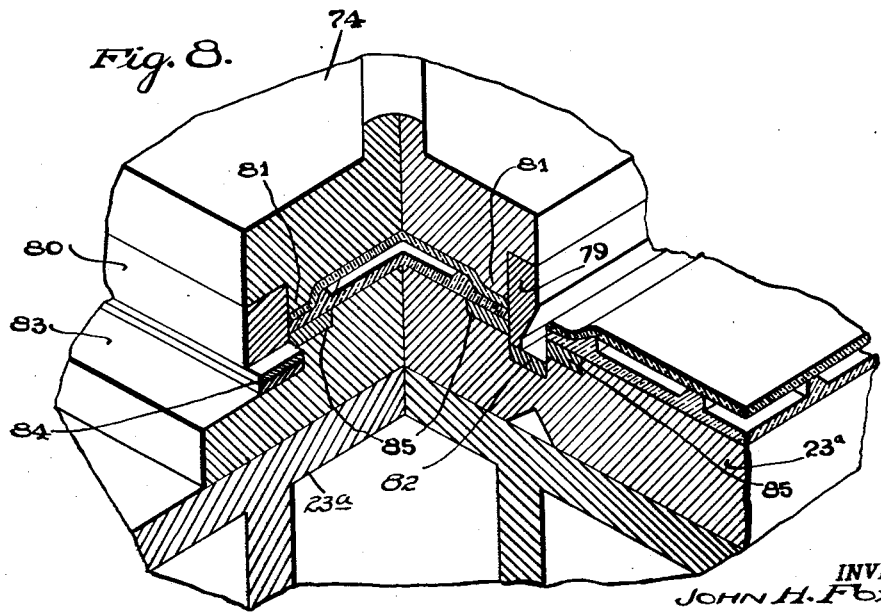
INVENTOR
JOHN H. FOX.
BY
ATTORNEYS.

Dec. 18, 1934.     J. H. FOX     1,984,924
APPARATUS FOR MAKING INSULATING GLASS
Filed Aug. 5, 1933     5 Sheets-Sheet 4

INVENTOR
John H. Fox.
BY
ATTORNEYS.

Dec. 18, 1934.  J. H. FOX  1,984,924
APPARATUS FOR MAKING INSULATING GLASS
Filed Aug. 5, 1933    5 Sheets-Sheet 5
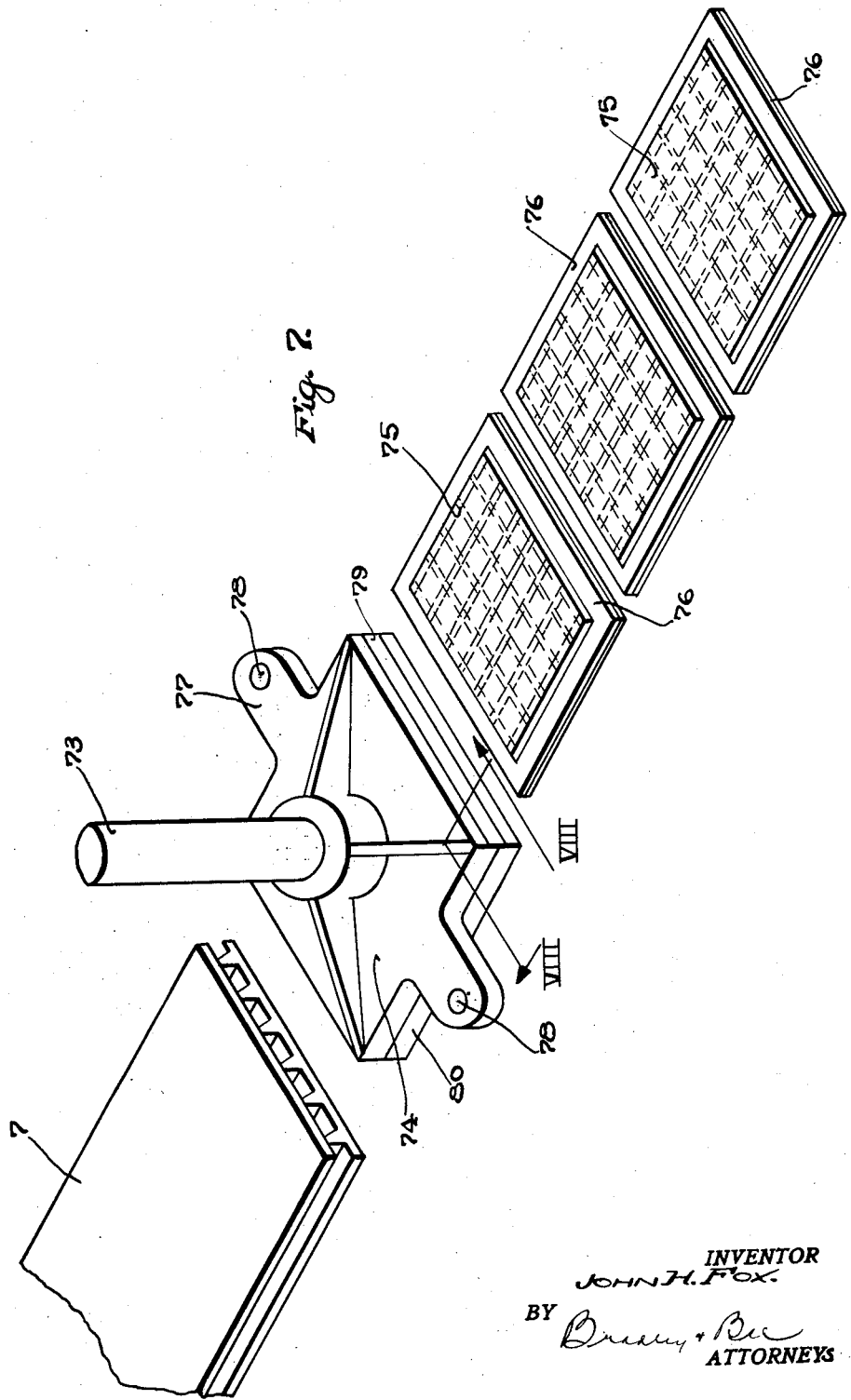
INVENTOR
John H. Fox.
BY
ATTORNEYS

UNITED STATES PATENT OFFICE 1,984,924

APPARATUS FOR MAKING INSULATING GLASS

John H. Fox, Pittsburgh, Pa., assignor to Pittsburgh Plate Glass Company, a corporation of Pennsylvania Application August 5, 1933, Serial No. 683,879

8 Claims. (Cl. 49—3)

The invention relates to apparatus for making insulating glass by a continuous process. Such glass comprises a plate formed from a pair of rolled sheets with air pockets therebetween; and the present apparatus has for its principal objects the provision of improved means for pressing the sheets together and severing the integral plate thus formed into sections as it comes from a continuous rolling apparatus and while the glass is still hot and plastic, and the provision of improved means for thinning the edges of the sections to form glazing margins thereon. Certain embodiments of the invention are illustrated in the accompanying drawings, wherein:

Figure 1 is a vertical section through the apparatus on the line I—I of Fig. 2. Fig. 2 is a vertical section on the line II—II of Fig. 1. Fig. 3 is a horizontal section on the line III—III of Fig. 1. Fig. 4 is a perspective view partially in section showing certain of the parts on an enlarged scale. Fig. 5 is a vertical section on an enlarged scale showing the plate before and after severing and the severing die. Fig. 6 is a perspective view showing a portion of one of the sections of the plate as mounted in its sash or frame. Fig. 7 is a perspective view illustrating a modification. And Fig. 8 is an enlarged section on the line VIII—VIII of Fig. 7.

Referring to the general arrangement of parts as shown in Figs. 1, 2, and 3, 1 is a melting tank and 2 is a forehearth having slots 3 and 4 through its bottom wall, through which the glass for the two sheets 5 and 6 for forming the continuous plate 7 are withdrawn. The forehearth is provided with a pair of burners 8 and 9 for maintaining the glass at the proper temperature and a water cooled shear cake 10 is employed at the inlet end of the forehearth for cutting off the supply of glass thereto when this becomes desirable or necessary for replacements or repair.

The sheet 5 is formed between the pair of water cooled rolls 11 and 12, the roll 11 having a plain surface, and the roll 12 being provided with longitudinal and circumferential grooves which results in the formation of a sheet provided with the ribs 13 and 14 (Fig. 4) between which are located the recesses 15. The sheet 6 is formed between the water cooled rolls 16 and 17 having plain surfaces. When the sheets are brought into contact and welded together, the resulting product is an endless plate made up of the two sheets and provided with rectangular air pockets therebetween, as indicated in Figs. 4 and 5. The two sheets are guided to horizontal position by the use of the aprons 18 and 19 which are made hollow and either air or water cooled. The sheet 5 is guided over the rollers 20 and burners 21, 21, 21 are employed for keeping the sheets at a high temperature so that they will weld together when they pass beneath the roll 22.

The roll 22 lies above an endless conveyor or table made up of the plates 23 carried by a pair of sprocket chains at the ends of the plates which sprocket chains pass around the sprockets 24 and 25 mounted upon the shafts 26 and 27. The shaft 27 is driven from a tumbler shaft 28 (Fig. 3) which is in turn driven from the countershaft 29 through the intermediary of the gears 30 and worm gearing located in the casing 31. The rolls 11, 12, 16, 17 and 22 are driven from the tumbler shafts 32, 33 and 34, and such tumbler shafts are all driven from the countershaft 29 by reduction gearing similar to that described in connection with the tumbler shaft 28. The shafts of the rolls 11 and 12 are provided with intermeshing spur gears 35 (Fig. 3) so that they are driven in opposite directions the one from the other, while the shafts of the rolls 16 and 17 are provided with intermeshing gears 36 so that they are driven in opposite directions the one from the other. After the sheet is cut into sections, as later described, such sections pass over the rolls 37 and into the roller leer 38, all of such rolls being driven by means of sprocket chains passing over sprockets at the ends of the rolls and driven from the countershaft 29 by means well known in the art.

A burner 39 following the roll 22 serves to keep the plate hot until the severing die acts thereon, while the burners 40 and 41 intermediate the conveyor and the leer serve to keep the severed plates hot until they enter the leer. In order to provide transverse slots in the table for receiving the severing die and the glass strips sheared off by the die, the opposing ends of the plates 23 are recessed, as indicated at 42 (Fig. 4), and a shear plate 43 is provided on each side of the slot or recess. These slots are just wide enough to receive the end of the severing die 44, which cuts out a section of the plate and presses it into the slot. As the plates 23 pass around the right hand sprocket 25, the slots open up and the strips of glass 45 which have been sheared from the plate drop into the receiving hopper 46. The die 44 is formed so that it not only severs the plate, but also thins it on each side of the sheared out strip so as to form the margins 47 (Fig. 4), which margins come into play when the section is placed in a sash or frame, as indicated in Fig. 6. Due to this expedient, it is possible to use relatively thin light sash despite the fact that the body of the glass is relatively thick and bulky. The side edges of the continuous plate are also thinned to provide the glazing margins 48. This is done preliminary to the operation of the die 44 by the roll 22 heretofore referred to, such roll being provided at its ends with sections 22a of larger diameter than the body of the roll. The roll 22, therefore, performs the double function of pressing the sheets together throughout their body portions to insure their welding and of thinning the edges of the plate thus formed to provide glazing margins.

The die 44 is mounted for movement toward and from the table in order to perform its severing function, and is also so supported that during the severing operation, it moves in the direction of travel of the plate. After the severing operation, the die is moved back to starting position preliminary to the next severing operation. In order to accomplish this result, the die is mounted upon a carrier frame 49 supported for movement back and forth in a horizontal direction by means of the guides 50 (Fig. 2). The guides 50, as well as the rolls 11, 12, 16, 17, and 22, the rollers 37, and the conveyor table, are all mounted upon the truck 51 carried upon rails 52 which permits the entire apparatus to be moved away from the end of the tank when this becomes necessary for replacement or repairs. The carrier 49 is normally held in its forward position, as indicated in Fig. 1, by means of the springs 53 on the rods 54, such rods being anchored at their forward ends to abutments carried by the truck frame. In order to move the carrier to the right during the severing operation, the front side of the carrier is provided with a pair of vertically movable bars 55, whose lower ends are adapted to be engaged by the trip members 56 projecting from the ends of the plates 23 when the bars 55 are in their lower positions, as indicated in Fig. 1. The trip members are so positioned with respect to the die 44 that they engage the ends of the bars 55 just as the die begins to move down so that during the downward movement of the die, the carrier which supports the die is moved to the right by the table. As soon as the die is removed from the glass, the bars 55 are moved upward releasing the trip members 56, so that the springs 53 move the carrier and die back to starting position. This cycle of movement is repeated for each cutting operation.

The means for moving the die up and down and for operating the trip members 55 is shown in Fig. 2. The die is carried by the plate 57 supported by links 58 upon the bell crank levers 59, and these bell crank levers are swung from the cutting off cylinder 60 through the intermediary of the plunger 61 and the connecting links 62 and 63. The bars 55 are suitably guided on the front side of the carrier and are moved up and down from the air cylinder 64 through the intermediary of the bell crank levers 65, the plunger rod 66 and the link 67. Any suitable means may be employed for controlling and timing the operation of the cylinders 60 and 64 to secure the sequence of operations heretofore described. If desired, this may be accomplished through suitable electrical control apparatus, including switches and time relays well known in the art. I have shown only the switch arm 68 and connections 69 for initiating the cycle, the switch arm being pivoted at 70 upon one of the bars 55 and having its lower end positioned so as to be engaged by the trip member 56 to close the contact 71 and complete the circuit at the moment the member 56 engages the bar 55. This switch closure controls the actuation of the valves which control the cylinder 60 so that the die is moved down quickly and retracted. A time relay then operates the valve of the cylinder 64 so that the bars 55 are retracted and the carrier 49 is moved back by the springs 63 to its starting position, the upward movement of the bar 55 permitting the switch arm 68 to open due to the action of the spring 71.

The operation of the die 44 is timed with respect to the sheet, as indicated in Fig. 5, so that such die operates midway between a pair of transverse ribs 14, 14, and the result produced by the operation of the die in shearing out the strip 45 and thinning the margins of the glass, is as illustrated in this figure. The roll 12 is preferably constructed so that the longitudinal ribs 13 are interrupted in the space between the ribs 14, 14 between which the shearing and flattening occurs. The sash 72 is applied to the marginal portions 47 and 48 of the sheet, as indicated in Fig. 6.

Figs. 7 and 8 illustrate a modification in which a plunger 73 carrying a die 74 is employed for cutting off the plate sections 75 and forming the four glazing margins 76. The plunger 73 is supported upon a carrier similar to the carrier 57 of the Fig. 1 construction and is moved up and down by similar means. The carrier moves in the direction of movement of the table during the pressing and cutting off operation as in the construction of Fig. 1. The die is provided with lugs 77 at its sides suitably guided by rods upon the carrier extending through the perforation 78. The die is provided with four shear plates 79, 80, 80, 80, and inward of each shear plate is a shoulder 81 (Fig. 8) for forming the glazing margins 76. The table plates 23a are in this case provided with transverse slots 82 and also with side slots or recesses 83, which latter serve to receive the glass strips 84 which are sheared or trimmed from the side edges of the glass plates. The table plates are provided with hardened shear plates 85 which may be removed and replaced from time to time as required.

What I claim is:

1. Apparatus for making insulating glass comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, and a die on the carrier mounted for movement toward and from the table and adapted to enter said grooves and sever the plate into sections.

2. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, a die on the carrier mounted for movement toward and from the table and adapted to enter said grooves and sever the plate into sections, and means whereby the carrier is moved with the table and the die is maintained in alignment with one of said grooves during the downward travel of the die in severing the plate.

3. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, engaging means between the table and the carrier for causing the carrier to move with the table, a die on the carrier mounted for movement toward and from the table to sever the plate into sections, and means for moving the carrier back to starting position after the die is withdrawn and said engaging means are released.

4. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, yielding means maintaining the carrier against movement in the direction of travel of the table, releasable engaging means between the table and carrier for causing the carrier to move with the table, and a die on the carrier mounted for movement toward and from the table to sever the plate into sections.

5. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, and a head on the carrier mounted for movement toward and from the table and adapted to thin an area of the plate extending transversely thereof from edge to edge.

6. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves extending transversely of the table, a carrier mounted in opposition to the table and movable back and forth longitudinally of the table, and a head on the carrier mounted for movement toward and from the table and adapted to thin an area of the plate extending transversely thereof from edge to edge, said head being provided with a die for severing the plate intermediate the side edges of said area.

7. Apparatus for making insulating glass, comprising means for continuously forming two sheets of glass and bringing them together while still plastic to form a continuous integral plate, said means being provided with projections to form air pockets in said plate, an endless horizontal conveyor adapted to receive and support the plate movable in the direction of travel thereof, and pressing means in opposition to the conveyor and mounted for reciprocation toward and from the conveyor and for movement with the conveyor and adapted to thin such plate at its side edges and also at spaced intervals transversely to provide glazing margins, said pressing means being provided with means for severing the plate into sections intermediate the edges of the transverse thinned areas.

8. Apparatus for making insulating glass, comprising means for continuously forming two sheets of glass and bringing them together while still plastic to form a continuous integral plate, said means being provided with projections to form air pockets in said plate, an endless conveyor or table for receiving the plate mounted for movement in the direction of travel of the plate, and provided with spaced die receiving grooves, a carrier mounted in opposition to the table and movable back and forth longitudinally of the table, and a die on the carrier mounted for movement toward and from the table and provided with means for severing the plate into sections and thinning the edges of such sections to provide glazing margins.

JOHN H. FOX.